United States Patent [19]

Price

[11] Patent Number: 4,675,519
[45] Date of Patent: * Jun. 23, 1987

[54] TOY HAVING OPTICALLY ACTUATED SOUND GENERATOR

[76] Inventor: William E. Price, 402 E. Roger Rd., Tucson, Ariz. 85705

[*] Notice: The portion of the term of this patent subsequent to Apr. 21, 2004 has been disclaimed.

[21] Appl. No.: 824,432

[22] Filed: Jan. 31, 1986

Related U.S. Application Data

[63] Continuation-in-part of Ser. No. 479,574, Mar. 28, 1983.

[51] Int. Cl.⁴ .............................................. H01J 40/14
[52] U.S. Cl. ................................ 250/209; 250/214 R; 250/221; 446/297; 446/397
[58] Field of Search ........... 250/206, 208, 209, 214 R, 250/214 SW, 221; 307/117; 340/555–557, 567, 573; 446/270, 297, 397, 298–302

[56] References Cited

U.S. PATENT DOCUMENTS

| | | | |
|---|---|---|---|
| 3,150,461 | 9/1964 | Grist | 46/232 |
| 3,191,048 | 6/1965 | Cowen | 250/251 |
| 3,274,729 | 9/1966 | Refabert | 46/232 |
| 3,343,281 | 9/1967 | Greer, Jr. et al. | 35/35 |
| 3,443,338 | 5/1969 | Collins | 46/227 |
| 3,444,384 | 5/1969 | Horeczky | 250/221 |
| 3,631,434 | 12/1971 | Schwartz | 340/228 |
| 3,702,937 | 11/1972 | Browning | 250/210 |
| 3,863,239 | 1/1975 | Campman | 250/578 |
| 4,002,899 | 1/1977 | Stauffer | 250/201 |
| 4,085,411 | 4/1978 | Genesi | 354/51 |
| 4,185,192 | 1/1980 | Wagner | 250/221 |
| 4,199,753 | 4/1980 | Gontowski, Jr. | 340/555 |
| 4,221,927 | 8/1980 | Dankman et al. | 179/1 |
| 4,317,992 | 3/1982 | Stauffer | 250/221 |
| 4,403,142 | 9/1983 | Kondo | 340/555 |

*Primary Examiner*—Edward P. Westin
*Attorney, Agent, or Firm*—Cahill, Sutton & Thomas

[57] ABSTRACT

A toy having an optically actuated sound generator includes first and second phototransistors coupled in series for creating a substantially binary output voltage based on the relative light intensities striking such phototransistors. A Schmitt-trigger circuit receives the binary output voltage and eliminates therefrom light-flicker components resulting from fluorescent lighting. Additional circuitry creates an enabling pulse at each transition of the Schmitt-trigger output signal, which enabling signal enables dual oscillator circuits. The dual oscillator output signals are gated together to drive a speaker for creating audible signals and to activate a light emitting diode. The electronic circuitry and speaker are housed in a baffle through which the phototransistors and light emitting diode protrude for communicating with a face portion of the toy.

25 Claims, 9 Drawing Figures

TOY HAVING OPTICALLY ACTUATED SOUND GENERATOR

CROSS-REFERENCE TO RELATED APPLICATION

This application is a continuation-in-part of copending patent application Ser. No. 479,574, filed Mar. 28, 1983, and entitled "OPTICAL SENSING CIRCUIT FOR AUDIO ACTIVATION OF TOYS".

BACKGROUND OF THE INVENTION

1. Field of the Invention

This invention relates generally to noise generating toys, and more particularly, to an optical sensing circuit for actuating a noise generator in a toy to emit at least one, and preferably plural, audible sounds, as well as the manner in which said optical sensing circuit, noise generator, and related components are mounted within such toy.

2. Description of the Prior Art

Children have in the past exhibited a desire to play with toys that mimic behavior typical of a real-life human or animal. The advancement of the electronics industry has made it possible for toys to more realistically portray the desired traits. In particular, toys which are capable of producing audible sounds upon activation by the user have in the past proven to be very successful.

Initially, noise-generating toys were manually activated by a user depressing various portions of the toy to force air through whistle or reed-type mechanisms. However, these manually actuated mechanisms failed to closely mimic or emit sounds which were typical of the human or animal which the toy portrayed. Further, such prior art toys had to be directly activated by the user and could not be sustained over any length of time.

Noise-generating toys were later adapted to incorporate electronic circuits to electrically control movement of toys and the audible sounds emitted therefrom. For example, U.S. Pat. No. 3,443,338 to Collins discloses a toy which simultaneously mimics a dog's physical movements while emitting an audible sound which imitates a dog's bark. The mechanism for producing the simulated dog movements and barks is directly activated by a switch controlled by the user.

The development of the photo-cell enabled toy manufacturers to provide toys which could be activated remotely by light. For example, U.S. Pat. No. 3,274,729 to Refabert discloses a doll having a photo-cell actuated sounding means. In particular, the Refabert patent discloses a photoconductive cell which is mounted in such a manner on the doll so that it can be irradiated by light, such as on the doll's chest or in one of the doll's eyes. A small electric motor is energized under control of the intensity of the irradiation of the photoconductive cell; the small electric motor powers one or more bellow and reed mechanisms, which mechanically create audible sounds.

As electrical technology has advanced, the need existed to provide remotely actuated toys which elicit a plurality of audible sounds without the need for providing plural mechanical bellows and reed combinations. Recently, the tendency has been to provide verbally actuated toys. For example, U.S. Pat. No. 4,221,927 to Dankman et al. discloses a voice responsive talking toy. The Dankman patent discloses a toy which, in response to a complex sound such as human speech, generates a train of audio pulses, and also activates LEDs positioned in eye and mouth portions of the body of the toy. The pulses generated by the Dankman toy are psuedo-random with respect to frequency composition and duration. Such toys require farily complex and expensive electrical circuits.

The need still exists to provide a toy which is remotely or automatically actuated to emit audible sounds and which is efficiently and inexpensively manufactured.

Light-activated toys are typically used by children indoors, and in some instances, where fluorescent lighting is used. In rooms where fluorescent lighting is present, significant amounts of 60 cycle and 120 cycle light flicker may be present, although imperceptible to the human eye. Toys incorporating photosensitive devices respond to varying degrees to such light flicker and produce an output signal which inclues a 60 cycle and-/or 120 cycle light flicker component. Care must be taken, when designing such toys for indoor use, to ignore or reject such light flicker components in order to avoid continuous triggering of the toy or other interference with its intended mode of operation.

Within the fields of intrusion alarms and automatic focusing cameras, it is known to use two or more photosensitive devices either to detect the passage of an object through a protected field or to detect the presence or absence of an object at a predetermined focal point. Examples of such optical systems are disclosed in U.S. Pat. Nos. 4,002,899; 4,317,992; and 3,631,434. However, such optical systems are not well suited for use within a toy intended for often rough handling by children. Such optical circuits typically require careful alignment of the optical sensors incorporated therein so that the optical paths viewed thereby overlap at a predetermined focal point or are otherwise positioned in a fixed relationship relative to one another. Obviously, it would be almost impossible to maintain any particular alignment between multiple photosensitive devices and-/or related optical paths within a toy that is likely to be dropped, thrown and/or kicked. In addition, such prior art optical systems employing multiple photosensitive devices are often designed to distinguish between a matched condition (when both photosensitive devices view the same relative light intensity) and a mismatched condition (when the photosensitive devices receive different relative light intensities). While it may be practical to distinguish between matched and mismatched conditions for an intrusion alarm or focusing device where relative alignments of the optical paths can be carefully controlled, such a detection system would not be practical for an optically actuated toy.

It has been determined that an optical sensing circuit for incorporation within a child's toy doll should lend a personality to the toy wherein it appears to respond differently to different people, or in actuality, to different types of clothing worn by persons playing with the toy under various lighting conditions. It is also deemed desirable to provide an optical sensing circuit allowing the toy to spontaneously respond to changes in naturally occurring lighting conditions, for example, sunrise, sunset, the creation of shadows and/or changes in room light induced by movement of clouds. In contrast, intrusion detection circuits and automatic focusing devices must be designed to ignore such changing ambient conditions in order to prevent the generation of false alarms and/or improper focusing signals.

As set forth above, a toy of the type described herein is intended to respond to a stimulus, preferably light-related, in order to generate a series of lifelike sounds. However, it has been found that attempts to generate such lifelike sounds with signals of a single frequency are insufficient. It has further been determined that, in order to make such a toy more appealing to children and others, that such audible sounds be retriggerable if the stimulus that initiated such sounds is repeated within a short period of time.

Of course, another difficulty faced by a toy designer in producing such an optically actuated toy for generating audible sounds is the matter of packaging the photosensitive devices, related electronic circuitry, and a related speaker in a form which may be easily incorporated within a doll or other toy, protecting such components from abuse, while minimizing the overall cost of the product.

Accordingly, it is an object of the present invention to provide an improved remotely activated circuit for causing audio signals to be emitted from a toy.

Another object of the present invention is to provide such a circuit which is inexpensive to manufacture, requires little power to operate in order to conserve battery power drain, and generates random, lifelike audio signals upon activation.

Another object of the present invention is to provide such a circuit which generates and emits sounds which are typical of the character which the toy portrays, such as a human child, an animal, or a television character.

A further object of the present invention is to provide a toy having an optically actuated sound generator which toy is substantially immune to light flicker conditions induced by fluorescent lighting.

A still further object of the present invention is to provide such a toy having a simple yet sensitive optical sensing circuit for reacting to movement of the toy and/or movement of persons or objects surrounding the toy in order to generate such audible sounds.

Yet another object of the present invention is to provide such a toy which appears to exhibit a personality by responding in a different manner to different persons and under different lighting conditions, and by responding to naturally occurring changes in ambient light conditions.

Still another object of the present invention is to provide such a toy having circuitry which can vary the frequency of the audible signals being generated, and which retriggers the generation of such audible signals when the initiating stimulus is repeated within a short period of time.

A further object of the present invention is to provide such a toy wherein the optical sensors, related circuitry, and associated speaker are assembled in a compact and inexpensive form for ready assembly within the body of a doll or other toy.

Another object of the present invention is to incorporate a light-emitting device within such a toy to provide a visual response to the child in combination with the audible response set forth above.

These and other objects of the present invention will become more apparent to those skilled in the art as the description thereof proceeds.

SUMMARY OF THE INVENTION

Briefly described, and in accordance with one embodiment thereof, the present invention relates to a toy doll having a face portion and generating audible signals in response to variations in light impinging on the doll body, the toy including dual phototransistors coupled in series to form a highly dynamic optical sensing network. The collector of the first phototransistor is coupled in common with the emitter of the second phototransistor at a summing junction to produce a junction voltage. The emitter of the first phototransistor and the collector of the second phototransistor are coupled, respectively, to and second power supply conductors. The light responsive base terminals of the first and second phototransistors receive light through respective holes formed in the doll body, preferably the face. Such a series coupling of the first and second phototransistors provides highly dynamic performance and produces a junction voltage which generally assumes one of two output voltage levels as determined by which of the two phototransistors receives relatively more light than the other. Small changes in the relative amount of light received by the first and second phototransistors are capable of switching the junction voltage from one of its two output voltage levels to the other. A detection circuit is further provided for responding to transitions of the junction voltage between its first and second output levels for generating a trigger pulse which enables an associated audio generator to generate audio signals for a predetermined period of time. A speaker coupled to the audio generator circuitry converts the audio signals to audible sounds.

Another aspect of the present invention relates to the incorporation of a Schmitt-trigger circuit within such a toy for responding to the voltage generated by the optical sensors, the Schmitt-trigger circuit helping to prevent the toy from responding to light flicker induced by fluorescent lighting. The Schmitt-trigger circuit imparts hysteresis to the input/output voltage transfer characteristics thereof and thereby reduces the possibility that variations in the voltage created by the optical sensor circuit due to light flicker will continuously retrigger the audio generator or otherwise interfere with its operation. The output of the Schmitt-trigger circuit preferably includes a pulse forming network which retriggers the audio generator upon each transition of the Schmitt-trigger circuit so that the emitted series of audible sounds can be retriggered if the optical sensing circuit is repeatedly switched within a short period of time.

Another aspect of the present invention relates to the provision of a relatively simple and inexpensive audio generator which nontheless provides a series of lifelike audible sounds. The audio generator includes first and second oscillators each having a gating input for receiving an enabling signal of a predetermined duration triggered by the optical sensing network of the toy. Each of the first and second oscillators provides an oscillating signal during the presence of the enabling signal. A logic gate has first and second input terminals for receiving the first and second oscillating signals generated by the first and second oscillators, respectively, and the output terminal of the logic gate provides a gated output signal. The frequency of the second oscillator is within the range of audio frequencies and relatively higher than the frequency of the first oscillating signal generated by the first oscillator. Accordingly, the gated output signal provided by the logic gate corresponds to the second oscillating signal gated by the first oscillating signal during the presence of the enabling signal. Preferably, the second oscillator includes a resistor-capacitor (RC) control network having an input control terminal coupled to the output of the aforementioned Schmitt-trigger circuit; the RC control network is operative to vary the frequency and/or duty cycle of the second oscillating signal in accordance with the output state of the Schmitt-trigger circuit.

A still further aspect of the present invention relates to providing a cylindrical baffle for incorporation within the toy, the baffle having a closed end and an opposing open end. Perforations are formed in the closed end for allowing audible sounds generated within the baffle to project through the closed end thereof. Additionally, at least one sensor hole is formed in the closed end, and an optical sensor extends therethrough. The optical sensor is mounted to a generally planar circuit component board disposed within the cylindrical baffle, and a speaker is also disposed within the cylindrical baffle near the open end thereof and directed toward the closed end thereof. A hole is formed in the toy doll body within a face portion thereof, and the cylindrical baffle is positioned within the doll body adjacent the face portion, the optical sensor extending through the hole formed in the face portion for receiving light directed toward and impinging upon the face portion of the toy doll. Preferably, a light emitting diode is also mounted to the component board and extends through holes formed in the closed end of the cylindrical baffle and within the adjacent face portion of the doll body for displaying visible light signals in conjunction with the audible signals emitted by the speaker.

DETAILED DESCRIPTION OF THE PREFERRED EMBODIMENTS

Figure 1:
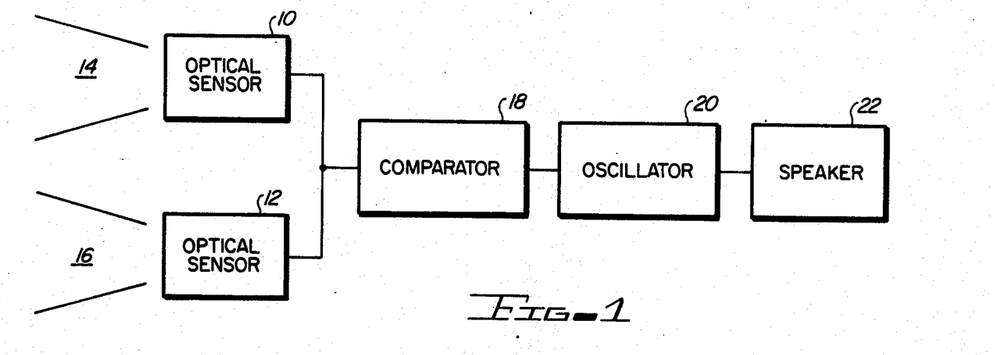
FIG. 1 is a block diagram of a first embodiment of the present invention including a pair of optical sensor.

Referring to the simplified block diagram of FIG. 1, two optical sensing circuits 10 and 12 sense the intensity of light in two fields of radiation 14 and 16, respectively. The fields of radiation 14 and 16 may constitute a single volume, with the optical sensors 10 and 12 simply directed toward separate areas of the volume. The optical sensors 10 and 12 are coupled together and serve as the input to a comparator circuit 18. The comparator circuit 18 monitors a reversal in the relative intensities of light between the fields of radiation 14 and 16 as detected by the optical sensing circuits 10 and 12. Upon detecting such a reversal, the comparator circuit 18 triggers a detection pulse, in a manner described below. Oscillator circuitry 20 is coupled to the comparator circuit 18 for receiving the detection pulse therefrom. The oscillator circuit 20 responds to the triggered pulse from the comparator circuit by generating random audio signals. The random audio signals are then input to a speaker circuit 22, where they are emitted.

Figure 2:
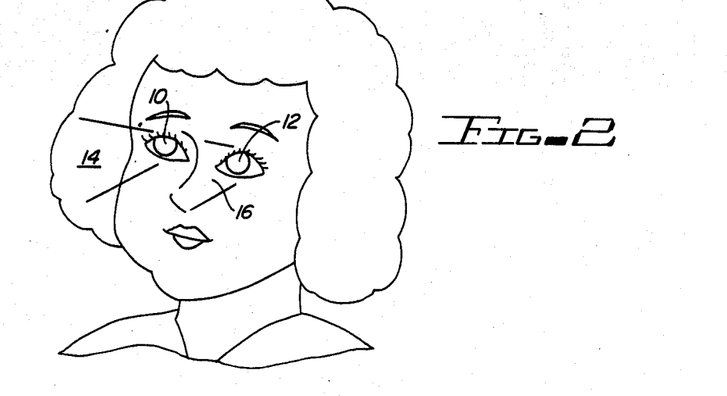
FIG. 2 is a plan view of the optical sensing circuit shown in FIG. 1 adapted for use in a toy in the form of a small doll.

Referring additionally to FIG. 2, the above described circuit is shown adapted for use in a toy doll which portrays a small child. The optical sensors 10 and 12 are positioned in the eyes of the doll, and the fields of radiation 14 and 16 are the areas generally in front thereof. The comparator circuit 18 and oscillator circuit 20 are preferably fabricated of low power IC's so that the circuits 18 and 20 can be positioned within the body of the doll and can operate for long periods of time powered by standard batteries. Generally, CMOS type IC's are preferred due to their minimal power drain. The speaker circuit 22 can be positioned beneath the doll's clothing, within the mouth of the doll, or generally behind the face of the doll, as described in greater detail below.

In the configuration shown in FIG. 2, if one eye of the doll is closed, or if an object is passed through either or both of the fields of radiation 14 and 16, a reversal in the relative intensities of light is detected by the optical sensing circuits 10 and 12. The comparator circuit 18 monitors the relative light intensities, and upon detecting a reversal, triggers a detection pulse for enabling oscillator circuit 20. Oscillator circuit 20 reacts to the detection pulse and generates random audio signals which are input to the speaker circuit 22. The speaker circuit 22 emits audible sounds which if desired, can be programmed to sound like a small child.

Figure 3:
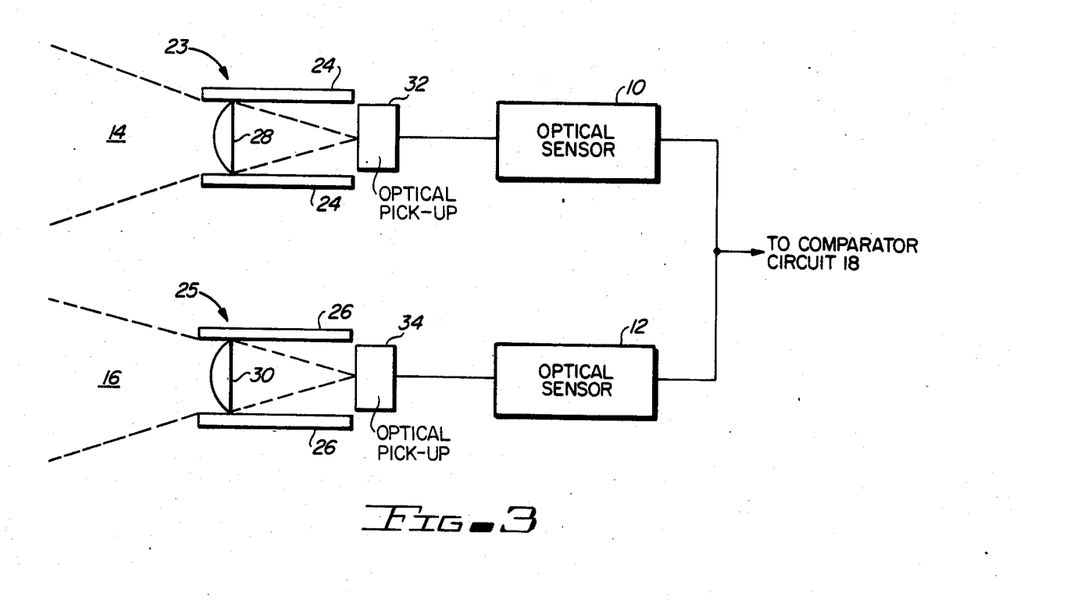
FIG. 3 is a partial cross-sectional view and block diagram of a mechanism for focusing and controlling light received from a pair of optical fields onto optical sensors.

Shown in FIG. 3 are first and second light amplifying devices 23 and 25. Devices 23 and 25 comprise cylindrical channels 24 and 26 which hold in place cylindrical lenses 28 and 30, respectively. Each of lenses 28 and 30 amplifies and intensifies the level of radiation within the fields 14 and 16, respectively, and focuses the radiation upon pickups 32 and 34, respectively. Thus, even small changes in the level of radiation within the fields 14 and 16 can be detected by the pickups 32 and 34. The pickups 32 and 34 are coupled to the optical sensing circuits 10 and 12, respectively. Pickups 32 and 34 shown in FIG. 3 may, for example, represent fiber optic channels or simple plastic lens-shaped jackets which encapsulate phototransistors designated by reference numerals 10 and 12. Pickups 32 and 34 may be integrated as part of optical sensors 10 and 12 whereby there would essentially be no difference therebetween. In fact, the lens-shaped jackets which typically encapsulate phototransistors 10 and 12 may be directly mounted in the eyes of the doll.

Figure 4:
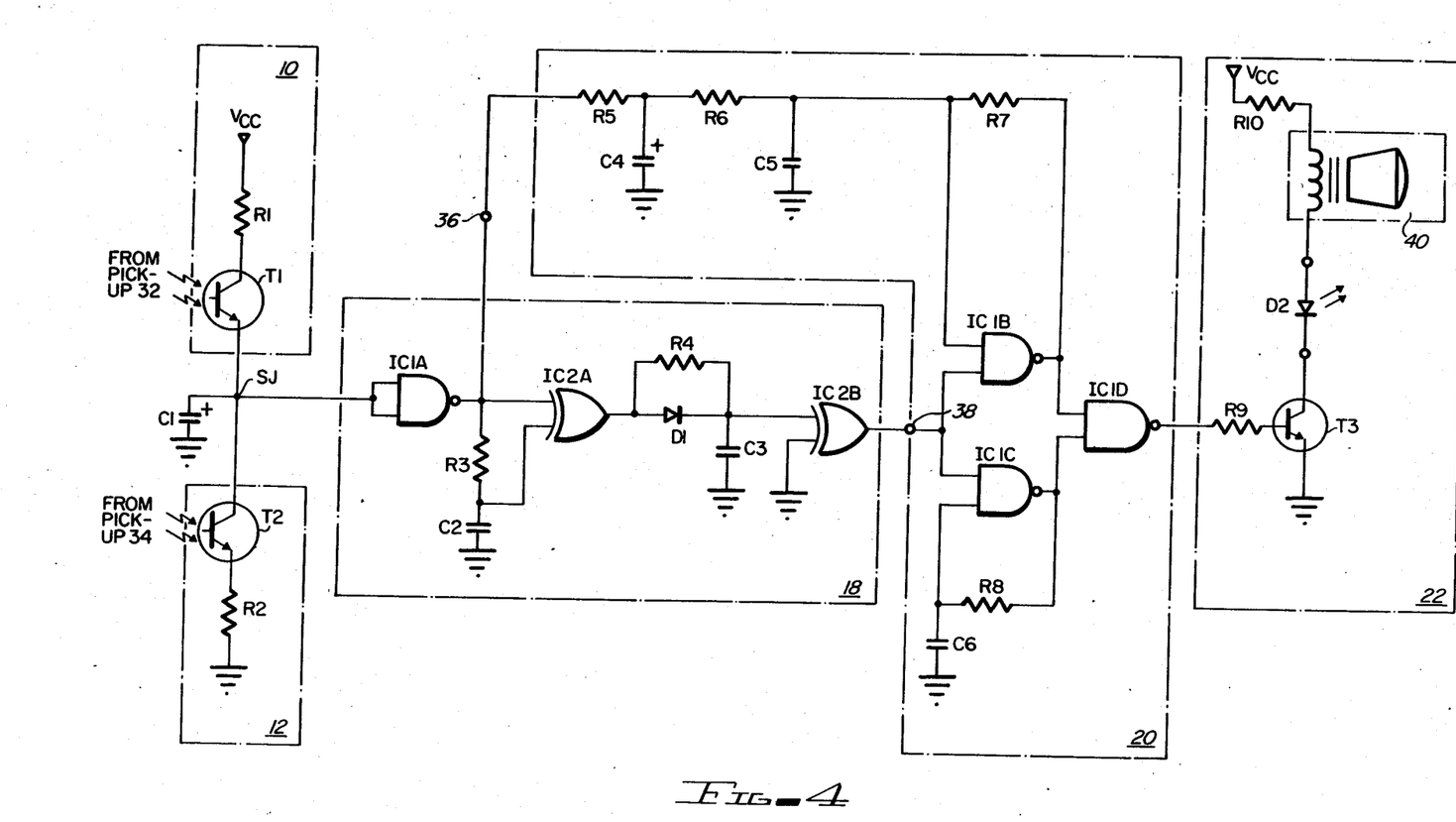
FIG. 4 is a detailed circuit schematic of a preferred embodiment of the circuitry shown in block form in FIG. 1.

Referring to FIG. 4, a detailed circuit schematic is shown as an exemplative means for carrying out the function of the block diagram of FIG. 1. The first optical sensing circuit 10 comprises a photoconductive transistor T1 having its base responsively coupled to the first amplifying apparatus 23 and pickup 32 for receiving light therefrom. As set forth above, phototransistor T1 may simply include a lens-shaped encapsulation jacket communicating with an eye of the doll. The collector of transistor T1 is coupled to positive power supply conductor $V_{CC}$ through a current limiting resistor R1. The emitter of transistor T1 is coupled to a summing junction SJ, the positive side of a filter capacitor C1, and to the second optical sensing circuit 12 at the collector of a second photoconductive transistor T2. The negative side of filter capacitor C1 is coupled to ground potential. Phototransistor T2 is responsively coupled to the second amplifying apparatus 25 at pickup 34 for receiving light therefrom. Phototransistor T2 may simply include a lens-shaped encapsulation jacket communicating with an eye of the doll. The emitter of transistor T2 is coupled to ground through current limiting resistor R2. In the preferred embodiment of the present invention, $V_{CC}$ is equal to +9V, resistors R1 and R2 have values of 1K ohm, and capacitor C1 has a value equal to 0.01 ufd.

The summing junction SJ creates a voltage that is responsive to the differential between the two fields of radiation 14 and 16, and serves as the input to the comparator circuit 18. The manner in which phototransistors T1 and T2 cooperate with one another to create a summing voltage at node SJ will now be described in greater detail. As described above, phototransistors T1 and T2 are coupled in series between power supply conductor $V_{CC}$ and ground potential. Light received by each phototransistor induces a current across the base-collector junction of the phototransistor which flows to the emitter thereof. This current is then amplified by the normal amplification action of the transistor to a collector-to-emitter current that is beta times the light induced current, beta being the collector current to base current amplification factor of the transistor.

Referring to FIG. 4, when phototransistors T1 and T2 are both illuminated and receiving relatively the same amount of light, both transistors are conducting and each phototransistor effectively serves as a current source for the other. Unless phototransistors T1 and T2 are perfectly matched, either T1 or T2 will have a higher amplification factor and will predominate when T1 and T2 receive the same relative amount of light. If, for example, T1 attempts to source more current to node SJ than T2 can sink, then T1 saturates and pulls the voltage at node SJ up toward power supply voltage $V_{cc}$. On the other hand if T2 predominates and attempts to sink more current than is sourced by T1, then T2 will saturate and pull the voltage at node SJ down toward ground potential.

Of course, the aforementioned initial state of phototransistors T1 and T2, and hence the initial voltage at node SJ, can be varied by altering the relative amounts of light received by T1 and T2. Assuming that T1 initially predominates and pulls node SJ high when T1 and T2 receive the same amount of light, the voltage at node SJ can be switched low either by slightly increasing the amount of light received by T2 or slightly decreasing the amount of light received by T1.

By coupling T1 and T2 in series, the dynamic light response and gain of the optical sensing network formed thereby is greatly enhanced over other types of optical sensors, allowing the summing junction thereof to directly drive digital logic elements without further amplification. Transistor T1 serves as a current source for transistor T2; if transistor T1 were replaced by a simple load resistor, the gain of the optical sensor network would be greatly reduced because such a load resistor, in practice, would need to have a resistance well below the effective impedance of transistor T2 in order to operate transistor T1 at its most efficient current levels at conventional power supply voltages. Since T2 also serves as a current source for transistor T1, the gain exhibited by transistor T1, as measured by changes in the voltage at node SJ, in response to changes of light received by T1 is many times greater than that which would result if a simple load resistor were substituted for transistor T2.

While prior art optical sensor networks are known employing series-coupled photoresistors or resistive bridge networks employing a photoresistor, such networks cannot provide the high gain and provide the dynamic response exhibited by the optical sensing network described herein.

A further advantage provided by the present optical sensing network is that the dual series-coupled phototransistors provide a degree of common mode rejection; if the light received by both of the phototransistors increases or decreases in unison, the summing junction voltage is not likely to switch from a high voltage level to a low voltage level, or vice versa.

Those skilled in the art will appreciate that the gain of the above-described optical sensor network decreases rapidly as the differential in the relative light intensities received by phototransistors T1 and T2 increases. Maximum light gain response is obtained only when T1 and T2 are both conducting and not saturated, hence, only when the voltage at node SJ is midway between power supply voltage $V_{cc}$ and ground.

Thus, the series connection of phototransistors T1 and T2 provides both high gain and common mode rejection, and causes the summing junction output voltage to skew rapidly between high and low voltage levels in response to transitions in the light intensity striking one such phototransistor from a state of relatively less light to a state of relatively more light than that received by the other phototransistor, and vice versa.

Referring again to FIG. 4, the summing junction SJ is coupled to both inputs of NAND gate IC1A (type 4093) of the low power CMOS type commercially available from Motorola Semiconductor Products, Inc. of Phoenix, Ariz. under model number MC14093B, a quad 2-input NAND Schmitt-trigger. In operation, it is assumed that transistors T1 and T2 are not perfectly matched and that transistor T1 has a higher gain than transistor T2. As a result, when T1 and T2 are directed toward a light background, the voltage level of the summing junction SJ will be driven high toward power supply voltage $V_{cc}$. As a dark object passes through field 14, the light received by phototransistor T1 is reduced, causing transistor T1 to lose base drive. As a result, transistor T2, wh still receives light, drives the summing junction SJ to a low voltage near ground potential. When the dark object passes out of field 14, transistor T1 again receives base drive, thus causing the summing junction SJ to return to a high voltage. A similar operation occurs when a light colored object passes through field 16 while field 14 is directed toward a relatively dark background; in this event, transistor T2 receives more base drive than transistor T1, temporarily pulling summing junction SJ to a low voltage until the light colored object leaves field 16 and transistor T2 is again directed at the relatively dark background. In this manner, a toy incorporating the optical sensor network of the present invention appears to take on a personality, responding in different ways to different people depending upon a person's clothing and background lighting conditions.

Still referring to FIG. 4, the output of NAND gate IC1A will switch high when the summing junction SJ passes from a logical 1 state to a logical zero state. Thus, as the dark object passes through the light field 14, the summing junction SJ drops to a logical 0 and causes the output of NAND gate IC1A to switch to logical 1. As set forth above, NAND gate IC1A is preferably one-fourth of a quad 2-input Schmitt-trigger NAND integrated circuit. As is known to those skilled in the art, Schmitt-trigger circuits provide a binary output signal having first and second logic states, the binary output signal switching between such first and second logic states in response to the voltage of an input signal. Schmitt-trigger circuits impart hysteresis to the input-/output voltage transfer characteristics thereof. The input portion of a Schmitt-trigger circuit has first and second threshold voltages at which the binary output changes state. When the input voltage falls below a first threshold voltage, the binary output signal switches to a first logic state. When the light responsive voltage rises above a second threshold voltage, the binary output signal switches to a second logic state. The first threshold voltage is of lesser magnitude, or a lower voltage, than the second threshold voltage in order to impart the aforementioned hysteresis characteristics to the input-/output voltage transfer curve. Schmitt-trigger circuits serve to sharpen rising and falling edges of the input signal and provide increased immunity to noise imposed upon the input signal. By buffering the summing junction voltage at node SJ with Schmitt-trigger NAND gate IC1A, the rising and falling edges of the summing junction voltage are sharpened, and the immunity of the toy doll to light flicker conditions resulting from fluorescent lighting, is increased.

Referring again to FIG. 4, the output of NAND gate IC1A is coupled to a first input of EXCLUSIVE-OR (XOR) gate IC2A (CMOS type 4070) and to the second input of XOR gate IC2A through a resistor R3. The second input of XOR gate IC2A is also coupled to ground through charging capacitor C2. In its preferred form, resistor R3 has a value of 100K ohms and capacitor C2 has a value of 0.1 ufd. As is known to those skilled in the art, the output of an EXCLUSIVE-OR gate is low when the two input signals are the same logic state, while the output is high when the two input signals are of different logic states.

Figure 9:
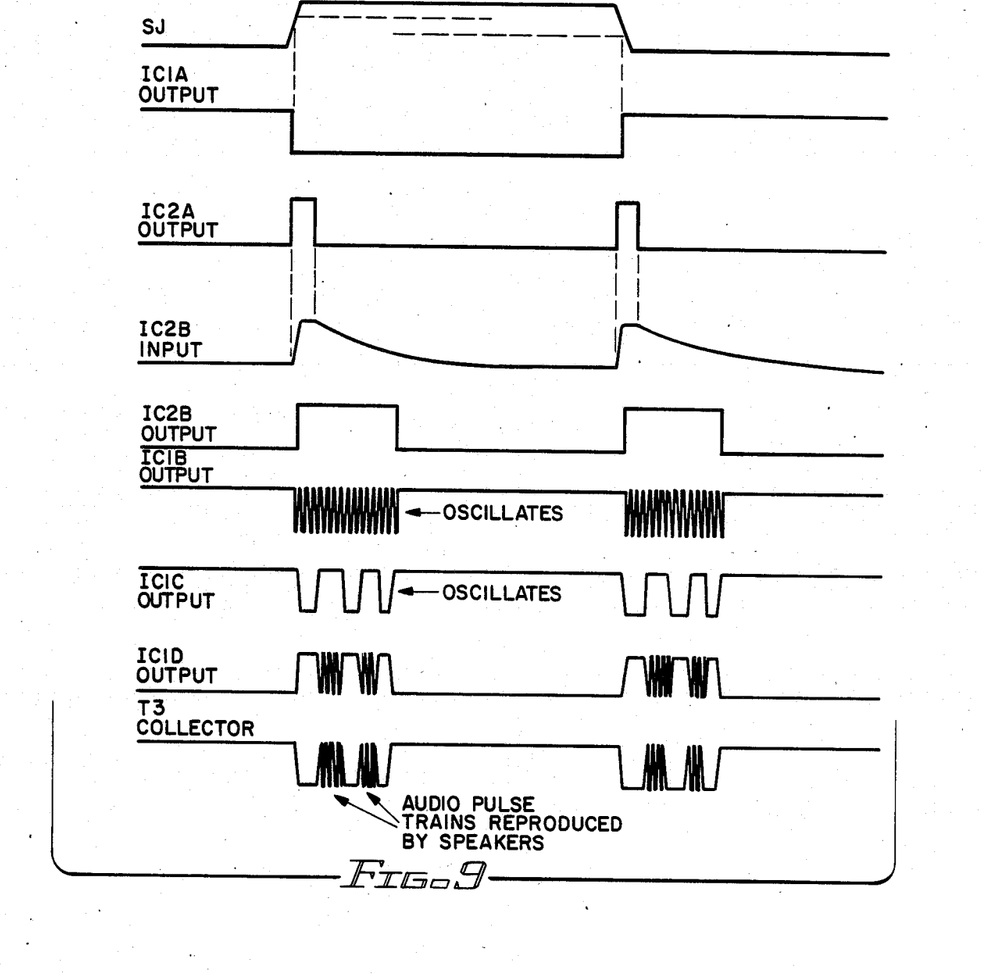
FIG. 9 is a timing waveform diagram indicating voltage waveforms for various nodes within the circuit schematic shown in FIG. 4.

Assuming that the output of NAND gate IC1A was initially low or logical 0, both the first and second inputs to XOR gate IC2A are initially low, and the output of XOR gate IC2A is also low. When the output of NAND gate IC1A switches high to logical 1, the output of XOR gate IC2A also switches high. After the output of the NAND gate IC1A switches to logical 1, the second input to XOR gate IC2A charges from ground toward a logical 1 voltage level in accordance with time constant R3C2. When the second input to XOR gate IC2A also reaches logical 1, the output of XOR gate IC2A switches back low to logical 0, thereby providing a short positive trigger pulse. In its preferred embodiment, the positive trigger pulse acts as a transition detector for indicating that the summing junction voltage has undergone a transition, and has a duration of approximately 7 milliseconds. This pulse is shown in FIG. 9 as the second IC2A output positive pulse coinciding with the low to high transition of the IC1A output.

Those skilled in art will appreciate that XOR gate IC2A, in combination with the time-delay network formed by R3 and C2, serves as an edge detector for creating a positive pulse of relatively short duration each time the binary output signal of the Schmitt-trigger NAND gate IC1A switches between its first and second logic states. Referring briefly to FIG. 9, it will be noted that the output of XOR gate IC2A provides a similar trigger pulse upon detecting the high to low edge of the output signal provided by NAND gate IC1A.

The output of XOR gate IC2A is coupled to a first input of a second XOR gate IC2B (CMOS type 4070) through the parallel combination of a diode D1 and a resistor R4. The first input of XOR gate IC2B is also coupled to ground through capacitor C3. In the preferred form, diode D1 is a type 1N914 diode, resistor R4 has a value of 1 Megohm, and capacitor C3 has a value of 1 ufd. The second input of XOR gate IC2B is coupled to ground, and accordingly, XOR gate IC2B serves as a non-inverting logic gate and provides conventional logic state voltage levels at its output based upon the voltage present at its input. Components D1, R4, C3 and XOR gate IC2B are sometimes referred to herein as a pulse forming network and collectively serve to provide an extended trigger pulse, or enabling signal, used to activate the audio generator in a manner described below.

When XOR gate IC2A emits a positive trigger pulse, the first input to XOR gate IC2B initially switches to a positive voltage and then slowly discharges toward ground, or logical 0. The decay curve for the voltage at the first input of XOR gate IC2B is shown in FIG. 9. The total decay time is approximately 2.5 seconds. When the input to XOR gate IC2B switches to a logical 1, the output of XOR gate IC2B also switches to logical 1, as shown in FIG. 9. The output of XOR gate IC2B remains at a logical 1 voltage until the first input thereof decays below the input threshold level of XOR gate IC2B, which occurs at approximately 650 milliseconds after initially switching to logical 1. Thus, XOR gate IC2B serves to extend or stretch out the initial 7 millisecond positive trigger pulse providing by XOR gate IC2A to a longer 650 millisecond extended trigger pulse or enabling signal.

Still referring to FIG. 4, those skilled in the art will appreciate that the extended trigger pulse provided by the aforementioned pulse forming network is retriggered each time XOR gate IC2A signals that it has detected a transition in the summing junction voltage. In the event that a second trigger pulse is provided by XOR gate IC2A shortly after providing an initial trigger pulse, diode D1 will recharge capacitor C3 to a high voltage level from which it again begins to decay through resistor R4.

The output of NAND gate IC1A, in addition to generating a trigger pulse via XOR gate IC2A, serves as one of the inputs to an oscillator circuit 20. As shown in FIG. 4, the output of NAND gate IC1A is coupled to control terminal 36 of oscillator circuit 20. The enabling signal provided at the output of XOR gate IC2B also serves as an input to oscillating circuit 20 and is coupled to terminal 38 thereof.

As the output of NAND gate IC1A switches to a logical 1, the input terminal 36 to oscillator circuit 20 is switched to a high voltage. Control terminal 36 is coupled through resistor R5 to a first terminal of capacitor C4, the opposite terminal of which is coupled to ground. In a preferred form, R5 has a value of 27K ohms, and C4 has a value of 4.7 ufd. Thus, as control terminal 36 is switched to a high voltage, capacitor C4 is charged positively through resistor R5. The positive side of capacitor C4 is coupled through resistor R6 to the positive terminal of another charging capacitor C5, the negative terminal of which is coupled to ground. The preferred value of R6 is 47K ohms, and the preferred value of C5 is 0.022 ufd. Resistors R5 and R6, and capacitor C4 are sometimes collectively referred to herein as an RC control network; terminal 36 is sometimes referred to as the input control terminal of the RC control network, while the positive terminal of capacitor C5 is referred to as an output control terminal thereof. The RC control network is used to selectively vary the frequency of an oscillating signal produced by oscillator circuit 20 in a manner described in greater detail below.

Within oscillator circuit 20, two oscillator circuits are provided for generating two oscillating signals of first and second frequencies. A first frequency signal is generated by NAND gate IC1C, and a second oscillating signal is provided by NAND gate IC1B. Each such NAND gate is preferably of the type 4093 described above; hence, each such NAND gate may be one-fourth of the quad NAND Schmitt-trigger integrated circuit described above, whereby NAND gate IC1A, IC1B, and IC1C are provided by a single CMOS integrated circuit.

Still referring to FIG. 4, the positive side of capacitor C5, i.e., the output control terminal of the RC control network, is coupled to a first input of NAND gate IC1B. The output of NAND gate IC1B is coupled to the first input thereof through a feedback resistor R7, which resistor preferably has a value of 47K ohms. The enabling signal provided to terminal 38 by the output of XOR gate IC2B is coupled to the second input of NAND gate IC1B and to a first input of NAND gate IC1C for selectively enabling or disabling the oscillating signals produced thereby. The second input of NAND gate IC1C is coupled through a charging capacitor C6 to ground and is also coupled by a feedback resistor R8 to the output of NAND gate IC1C. In the preferred embodiment of the present invention, C6 and R8 have values of 1 ufd. and 100K ohms, respectively. A further NAND gate IC1D (also type 4093) is provided for gating together the oscillating signals generated at the output terminals of NAND gates IC1B and IC1C. Thus, the output of NAND gate of IC1C and the output of NAND gate IC1B are coupled to first and second inputs, respectively, of NAND gate IC1D. All of the above-described components within dashed block 20 of FIG. 4 are sometimes referred to herein as an audio generator for generating audio signals. Those skilled in the art will appreciate, however, that commercially available integrated circuits specifically designed to generate audio signals for providing a variety of sounds, may also be used as an audio generator as opposed to the oscillator circuit 20.

In operation, as the control voltage applied to input terminal 36 of oscillator circuit 20 switches to a logical 1, capacitor C4 charges according to the R5 C4 time constant, causing C5 to simultaneously charge via current supplied through resistor R6. Capacitor C4 charges from approximately 2 volts to 6 volts in about 170 milliseconds. During that time, the enabling signal provided to input terminal 38 of oscillator circuit 20 switches to a logical 1 level and enables NAND gate IC1B to generate an oscillating signal at its output, in accordance with the R7 C5 time constant, as modified by the RC control network current conducted through resistor R6. As a result, NAND gate IC1B emits at its output an oscillating signal having a frequency and a duty cycle which are varied during the period over which capacitor C4 is charged. The oscillating signal produced at the output of NAND gate IC1B is selected to fall within the range of audio signals that is easily heard by the human ear.

The enabling signal provided to input terminal 38 of oscillator circuit 20 is also coupled to the first (or gating) input of NAND gate IC1C for allowing the same to generate an oscillating signal of a fixed frequency at its output in the form of a square wave having a period of approximately 170 milliseconds. The oscillating signals produced at the output terminals of NAND gates IC1B and IC1C are shown in FIG. 9 during each occurrence of the enabling signal provided by the output of XOR gate IC2B. As shown in FIG. 9, the oscillating signal produced at the output of NAND gate IC1C is of a much lower frequency than the oscillating signal produced at the output of NAND gate IC1B.

At least once, and typically several times, during the 650 millisecond enabling signal positive pulse, the output of NAND gate IC1C is high. During each such interval, NAND gate IC1D is enabled to respond to the oscillating signal generated by NAND gate IC1B. When NAND gate IC1D is enabled, it provides at its output terminal a gated oscillating signal of the same frequency, but inverted in phase, as that provided at the output of NAND gate IC1B. The output waveform provided by NAND gate IC1D is shown in FIG. 9 and corresponds to a gated version of the oscillating signal produced by NAND gate IC1B.

The output of NAND gate IC1D is coupled through resistor R9 to the base of output transistor T3, the emitter of which is coupled to ground. The collector terminal of output transistor T3 is coupled to the cathode of a light emitting diode D2. The anode of LED D2 is coupled through the coil of a speaker 40 and current limiting resistor R10 to the positive power supply voltage $V_{cc}$. With reference to FIG. 9, each positive transition of the voltage at the output of NAND gate IC1D causes output transistor T3 to conduct, thereby causing current to flow through the coil of speaker 40, and through LED D2, at a frequency corresponding to the audio signals passed by NAND gate IC1D. Speaker 40 thus emits lifelike audible sounds, and LED D2 flashes on in accordance therewith.

For purposes of illustration, it will be assumed that a first series of audible sounds was generated as a result of a dark object passing into field 14 and thereby shadowing light from phototransistor T1, resulting in the summing junction voltage being pulled low. As the dark object leaves field 14, the summing junction voltage returns high and triggers yet another series of audible sounds in a similar manner. However, in this case, the output of NAND gate IC1A switches to a low level, and accordingly, the control voltage applied to control terminal 36 is switched to a low voltage for discharging capacitor C4 within the RC control network. Accordingly, the frequency signal produced by NAND gate IC1B will vary in a different manner from that caused to occur during the charging of capacitor C4 to a positive voltage. In this manner, input control terminal 36 responds to the output voltage of NAND gate IC1A to vary the manner in which the oscillating signal produced by NAND gate IC1B is generated.

In the foregoing description, it has been assumed that the gain of transistor T1 is higher than that of transistor T2. However, it should be evident that the circuit may be operated equally well if phototransistor T2 has a somewhat higher gain than. phototransistor T1. However, it is most desirable to have the gains of phototransistors T1 and T2 substantially matched to each other.

Figures 5, 6, 8:
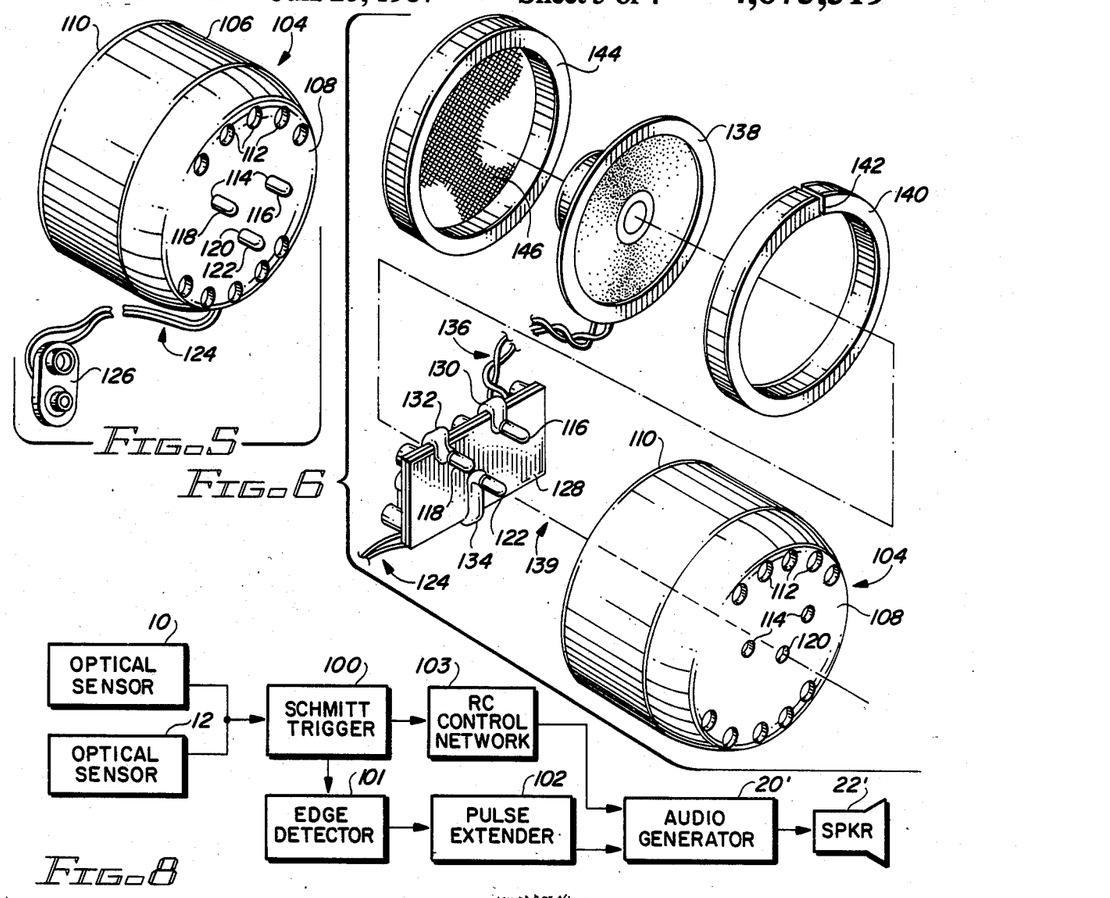
FIG. 5 is a perspective view of a cylindrical baffle housing the electronic components and speaker incorporated within a preferred embodiment of a toy having an optically actuated sound generator.
FIG. 6 is an exploded view of the cylindrical baffle and components housed therein as shown in FIG. 5.
FIG. 8 is a block diagram corresponding to the circuit schematic shown in FIG. 4.

FIG. 8 is an alternate form of the block diagram shown in FIG. 1, and blocks within FIG. 8 corresponding to those shown in FIG. 1 are identified by corresponding primed reference numerals. Within FIG. 8, optical sensors 10 and 12 correspond to the blocks designated 10 and 12 within FIG. 4. The summing junction voltage produced at the junction of optical sensors 10 and 12 is coupled as an input to Schmitt-trigger block 100, corresponding to NAND gate IC1A in FIG. 4. Schmitt-trigger block 100 provides an output coupled to edge detector block 101, corresponding to XOR gate IC2A, R3, and C2 in FIG. 4. Edge detector 101 is coupled to pulse extender block 102 for providing a trigger pulse thereto, and pulse extender block 102 is in turn coupled to audio generator block 20' for providing an enabling signal thereto. In addition, Schmitt-trigger block 100 provides a control voltage signal to RC control network 103; an output of RC control network 103 is coupled to audio generator block 20' for selectively varying at least the frequency or the duty cycle of the audio signal generated thereby. Finally, the output of audio generator block 20' is coupled to speaker 22' for converting the generated audio signals to audible sounds.

Figure 7:
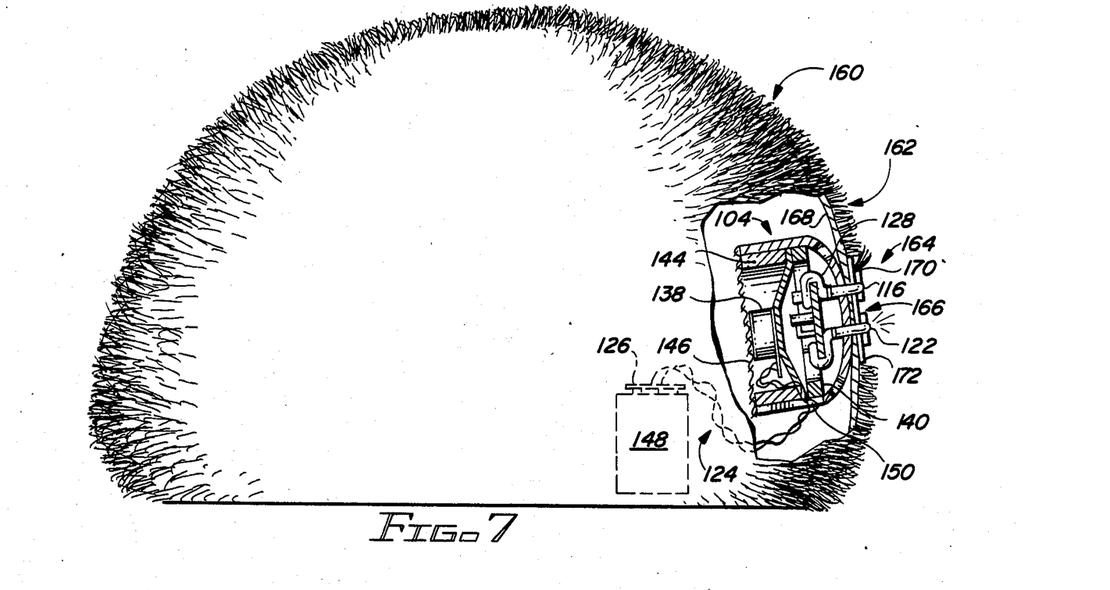
FIG. 7 is a cutaway cross-sectional view of a stuffed toy animal in which the cylindrical baffle of FIG. 5 has been mounted adjacent the face portion of the toy animal.

It will be recalled that another aspect of the present invention relates to the problem of providing the optical sensor network, related circuit components, and speaker in a compact and inexpensive form that may be easily and inexpensively assembled within a toy doll. In this regard, FIGS. 5, 6 and 7 show a preferred form of such a toy doll and the manner in which the active components can be assembled in an easy and inexpensive manner. With reference to FIGS. 5 and 6, a cylindrical baffle 104 is shown having cylindrical walls 106 of a given diameter. Baffle 104 includes a closed end 108 and an opposing open end 110. A series of perforations, some of which have been designated by reference numeral 112, are formed within closed end 108 of baffle 104 in order to permit audible sounds generated within baffle 104 to pass outwardly through baffle 104 through closed end 108.

Also formed within closed end 108 of baffle 104 are a pair of optical sensor holes, designated by reference numeral 114, as well as a light emitting diode hole 120. As shown in FIG. 5, lenses 116 and 118 of phototransistors T1 and T2 (see FIG. 4) extend through optical sensor holes 114, while plastic lens 122 of light emitting diode D2 (see FIG. 4) extends through hole 120. An aperture 150 (see FIG. 7) is provided within the cylindrical wall 106 of baffle 104 for permitting power supply conductors 124 to extend outwardly from baffle 104 for connection to a conventional 9 volt battery terminal clip 126.

Referring to the exploded view of baffle 104 in FIG. 6, a generally planar electronic circuit component board 128 is provided, preferably in the form of a printed circuit board having predrilled holes adapted to receive the integrated circuits and discrete components referenced in the circuit schematic of FIG. 4. Conductive leads 130 for phototransistor T1 are soldered to a rear face (with respect to the view shown in FIG. 6) of circuit board 128 and are bent around a side edge thereof to permit plastic lens 116 of phototransistor T1 to extend substantially perpendicular to the front face of circuit board 128. Similarly, conductive leads 132 are soldered to the rear face of circuit board 128 and extend about one of the side edges thereof to direct plastic lens 118 of phototransistor T2 substantially perpendicular from the front face of circuit board 128. Conductors 134 cause plastic lens 122 of LED D2 to extend from the front face of circuit board 128 in a similar manner. Power supply conductors 124 are soldered to circuit board 128 to provide electrical power thereto, while conductors 136 are soldered to circuit board 128 and extend to audio speaker 138 for driving the same.

As indicated by dashed line 139 in FIG. 6, circuit board 128 is disposed within cylindrical walls 106 of baffle 104 proximate closed end 108 for causing plastic lenses 116, 118 and 122 to extend through optical sensor holes 114 and LED hole 120 formed in closed end 108. Ideally, the length of circuit board 128 measured along the diagonal is commensurate with the inner diameter of cylindrical walls 106 for allowing circuit board 128 to be supported against lateral movement by cylindrical walls 106. A plastic retaining ring 140 having a split 142 formed therein is provided for insertion within baffle 104 behind circuit board 128 to maintain circuit board 128 advanced toward closed end 108. Split ring 140 has an external diameter commensurate with the internal diameter of cylindrical walls 106; the split 142 permits ring 140 to be slightly compressed while being inserted within cylindrical baffle 104 in order to more securely grip the internal walls of baffle 104 after ring 140 is inserted therein.

Still referring to FIG. 6, speaker 138 also has a diameter generally commensurate with the inner diameter of cylindrical walls 106 of baffle 104. Speaker 138 is disposed within baffle 104 behind retaining ring 140 and may rest against the rear radial flange thereof, whereby split ring 140 helps to support speaker 138. A further retaining ring 144, having an external diameter commensurate with the internal diameter of cylindrical walls 106, is inserted within baffle 104 for retaining speaker 138 against split ring 140. Retaining ring 144 preferably has a layer of sheet material 146 supported thereby preventing stuffing within the toy from contacting the speaker.

As shown in FIG. 7, cylindrical baffle 104, and the components housed therein, can easily be assembled within the body of a toy doll. Within FIG. 7, a stuffed furry animal toy is designated generally by reference numeral 160, including a face portion designated by reference numeral 162. Face portion 162 includes two eye regions, one of which is shown in FIG. 7 as 164, as well as a nose region 166.

Still referring to FIG. 7, toy 160 includes an outer body wall 168. Two sensor holes, one of which is designated by reference numeral 170, are formed within wall 168 at eye regions 164 for allowing the plastic lenses 116 and 118 of phototransistors T1 and T2 to extend therethrough for receiving light directed toward the face portion 162 of toy 160. In addition, another hole 172 is formed within wall 168 adjacent nose region 166 for permitting plastic lens 122 of LED D2 to extend therethrough in order to display flashing light signals upon face portion 162 of the toy 160. Closed end 108 of baffle 104 is secured to the inner face of body wall 168 in order to maintain plastic lenses 116, 118 and 122 within their respective positions upon face region 162 of toy 160. A 9 volt battery, shown in dashed outline by reference numeral 148, is provided for attachment to battery terminal clip 126 in order to provide electrical power for the optical sensor network, sound generator, and related components.

In the preferred embodiment of the present invention, plastic lens 122, corresponding to LED D2, is positioned relatively near at least one of plastic lenses 116 and 118, corresponding to phototransistors T1 and T2, for example, less than one inch apart. It has been found that by placing a toy incorporating the present invention in a drawer or darkened corner under subdued lighting conditions, that a feedback condition may be created, particularly when the face portion of the toy doll is closely adjacent to a light-reflective surface, such as a wall. In such instances, turning off the room lights, or closing a drawer, is often sufficient to bring about a reversal of the optical sensor network, thereby causing audible sounds and flashing of the nose LED. The light flashes emitted by the nose LED can be fed back, under subdued lighting conditions, as by reflecting off of a closely adjacent wall, into one of the phototransistors, retriggering the generation of audible sounds and light flashes. When operating in such mode, the toy appears to react, as if by crying, to the closing of the drawer or darkening of the room lights.

While the present invention has been described with reference to certain preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. A toy doll including optical sensor means for triggering the generation of sounds in response to variations in light striking the optical sensor means, comprising in combination:
   (a) a doll body including a face portion, said face portion including at least one sensor hole formed therein;
   (b) a cylindrical baffle having cylindrical walls of a predetermined diameter and having a first closed end and a second opposing open end, said first closed end having a plurality of perforations formed therein for permitting the passage of sounds therethrough, said closed end further including at least one sensor hole formed therein;
   (c) a generally planar electronic circuit component board having at least one optical sensor mounted thereto and electrically coupled therewith, said optical sensor extending substantially perpendicular from said component board, said component board being disposed within and supported by the cylindrical walls of said baffle proximate said first closed end thereof, said optical sensor extending through the sensor hole of said first closed end of said baffle;
   (d) electronic circuitry mounted upon said component board and responsive to said optical sensor for generating audio signals;
   (e) a speaker electrically coupled to said electronic circuitry and having a diameter substantially commensurate with the predetermined diameter of said cylindrical baffle, said speaker being disposed within said cylindrical baffle proximate the open end thereof and directed toward the closed end of said cylindrical baffle for directing audio sounds out of said plurality of perforations; and
   (f) means for positioning said cylindrical baffle within said doll body proximate said face portion, said optical sensor extending through the sensor hole formed within said face portion for receiving light directed toward the face portion of said doll body.

2. A toy doll as recited by claim 1 wherein said at least one sensor hole formed in the face portion of said doll body is formed at an eye region thereof, said at least one optical sensor receiving light directed toward the eye region of the face portion of said doll body.

3. A toy doll as recited by claim 1 wherein said cylindrical baffle has an aperture formed in the cylindrical walls thereof, and wherein said toy doll further includes electrical conductors coupled to said component board and extending outwardly through the aperture formed in the cylindrical walls of said cylindrical baffle for connection to an electrical power source located external from said cylindrical baffle.

4. A toy doll as recited by claim 1 further including a light source mounted to said component board and electrically coupled with said electronic circuitry for generating light signals when said audio signals are generated, the closed end of said cylindrical baffle having at least a second hole formed therein, said light source extending through said second hole, said face portion of said doll body including at least a second hole formed therein, said light source extending through the second hole in said face portion for displaying said light signals upon said face portion of said toy doll.

5. A toy doll having a face portion and generating audible and visual signals in response to variations in light impinging on said face portion, comprising in combination:
   (a) optical sensor means disposed within the face portion of said toy doll for creating a voltage responsive to light received by said face portion;
   (b) detecting means coupled to said optical sensor means for detecting a change in said light responsive voltage and generating a trigger pulse in response thereto;
   (c) an electrical circuit coupled to said detecting means and responsive to said trigger pulse for generating audio signals in response thereto;
   (d) a speaker coupled to said electrical circuit for receiving said audio signals and providing audible signals in response thereto; and
   (e) a light emitting device communicating with the face portion of said toy doll and coupled to said electrical circuit, said light-emitting device providing visual signals from the face portion of said toy doll generally corresponding to said audible signals provided by said speaker.

6. A toy doll as recited by claim 5 wherein the face portion of said toy doll has a hole formed therein at a point corresponding to a nose of said toy doll, and wherein said light-emitting device protrudes through said hole.

7. A toy doll as recited by claim 6 wherein said optical sensor means and said light-emitting device are disposed within the face portion of said toy doll relatively near one another to permit feedback of light signals emitted by said light-emitting device to said optical sensor means under subdued ambient lighting conditions.

8. A toy doll having a doll body generating audible signals in response to variations in light impinging on first and second portions thereof, comprising in combination:
- (a) a first phototransistor having an emitter, a light responsive base, and a collector;
- (b) first means for coupling the emitter of said first phototransistor to ground potential;
- (c) a second phototransistor having an emitter, a light responsive base, and a collector;
- (d) second means for coupling the collector of said second phototransistor to a supply voltage;
- (e) third means for coupling the collector of said first phototransistor with the emitter of said second phototransistor at a summing junction to produce a junction voltage;
- (f) the doll body of said toy doll including at least first and second holes formed therein for passing light to said first and second phototransistors, respectively;
- (g) said junction voltage generally assuming one of two output voltage levels in accordance with the relative amounts of light received by said first and second phototransistors, said junction voltage assuming a first output voltage level relatively near ground potential when said first phototransistor receives more light than said second phototransistor, said junction voltage assuming a second output voltage level relatively near the supply voltage when said first phototransistor receives less light than said second phototransistor;
- (h) detecting means coupled to said summing junction and responsive to transitions of the junction voltage between the first and second output voltage levels for generating a trigger pulse in response to such transitions;
- (i) audio generator means coupled to said detecting means and responsive to said trigger pulse for generating audio signals for a predetermined duration; and
- (j) a speaker coupled to said audio generator means for providing audible signals in response to said audio signals.

9. A toy doll as recited by claim 8 wherein said first and second means are each current limiting resistors.

10. A toy doll as recited by claim 8 further including a Schmitt-trigger circuit having an input coupled to said summing junction and a binary output coupled to said detecting means, said Schmitt-trigger circuit serving to sharpen rising and falling edges of transitions of the junction voltage, and serving to increase the immunity of said toy doll to light flicker conditions resulting from fluorescent lighting.

11. A toy doll as recited by claim 10 wherein said detecting means detects each transition of said binary output of said Schmitt-trigger circuit and generates said trigger pulse in response thereto.

12. A toy doll having a doll body and generating audible signals in response to variations in light impinging on said doll body, comprising in combination:
- (a) optical sensor means communicating with the doll body of said toy doll for creating a voltage responsive to light received by said optical sensor means;
- (b) a Schmitt-trigger circuit having at least one input coupled to said optical sensor means for receiving the light responsive voltage and having an output for providing a binary output signal having first and second logic states, said binary output signal switching to a first logic state when said light responsive voltage falls below a first threshold voltage and switching to a second logic state when said light responsive voltage rises above a second threshold voltage, said first threshold voltage being of lesser magnitude than said second threshold voltage for imparting hysteresis to the input/output voltage transfer characteristics of said Schmitt-trigger circuit, said Schmitt-trigger circuit thereby serving to sharpen rising and falling edges of transitions of said light responsive voltage, and serving to increase the immunity of said toy doll to light flicker conditions resulting from flourescent lighting;
- (c) detecting means coupled to the output of said Schmitt-trigger circuit for detecting transitions in the binary output signal provided thereby and generating a trigger pulse of predetermined duration in response thereto;
- (d) audio generator means coupled to said detecting means and responsive to said trigger pulse for generating audio signals; and
- (e) a speaker coupled to said audio generator means for providing audible signals in response to said audio signals.

13. A toy doll as recited by claim 12 wherein said detecting means includes a pulse forming network including a diode, a resistor, and a capacitor, said resistor and capacitor being interconnected at a common node to cause said common node to discharge at an associated RC time constant, said diode being connected to said common node and coupled to the output of said Schmitt-trigger circuit for charging said common node in response to a transition of said binary output signal, said trigger pulse being derived from said common node.

14. A toy doll as recited by claim 13 wherein said detecting means further includes an edge detector circuit coupled between the output of said Schmitt-trigger circuit and said pulse forming network for creating a positive pulse of relatively short duration each time the binary output signal of said Schmitt-trigger circuit switches between the first and second logic states, said positive pulse created by said edge detector circuit causing the diode of said pulse forming network to charge said common node for subsequent discharge by the resistor and capacitor of said pulse forming network.

15. A toy doll as recited by claim 14 wherein said edge detector circuit includes an exclusive-OR logic gate having first and second inputs, the first input of said exclusive-OR gate being directly coupled to said Schmitt-trigger circuit output, the second input of said exclusive-OR gate being coupled through a time-delay network to said Schmitt-trigger circuit output for receiving said binary output signal delayed by a relatively short period corresponding to the relatively short duration of the positive pulse created by said edge detector circuit.

16. A toy doll as recited by claim 13 wherein said pulse forming network is retriggered each time said common node thereof is charged by said diode.

17. A toy doll including optical sensor means for triggering the generation of lifelike sounds from the toy doll, comprising in combination:
- (a) a doll body having at least one hole formed therein;
- (b) optical sensor means disposed within said doll body and communicating with said hole therein for receiving light therethrough and generating an electrical signal in response thereto;

(c) circuit means coupled to said optical sensor means and responsive to predetermined changes in said light responsive electrical signal for providing an enabling signal of a predetermined duration;

(d) a first oscillator coupled to said circuit means and having a gating input for receiving said enabling signal, said first oscillator having an output for providing a first oscillating signal of a first frequency during the presence of said enabling signal;

(e) a second oscillator coupled to said circuit means and having a gating input for receiving said enabling signal, said second oscillator having an output for providing a second oscillating signal of a second frequency during the presence of said enabling signal, the second frequency being within the range of audio frequencies and relatively higher than said first frequency;

(f) logic gating means having first and second input terminals, said first input terminal being coupled to the output of said first oscillator for receiving said first oscillating signal, said second input terminal being coupled to the output of said second oscillator for receiving said second oscillating signal, said logic gating means having an output terminal providing a gated output signal corresponding to said second oscillating signal gated by said first oscillating signal during the presence of said enabling signal; and (g) a speaker mounted within said doll body and coupled to the output terminal of said logic gating means and responsive to the gated output signal for providing said lifelike sounds.

18. A toy doll as recited by claim 17 wherein said circuit means includes a Schmitt-trigger circuit having an input coupled to said optical sensor means for receiving said light responsive electrical signal therefrom, said Schmitt-trigger circuit including an output for providing a binary output signal having first and second logic states, said binary output signal switching to a first logic state when said light responsive electrical signal falls below a first threshold level and switching to a second logic state when said light responsive electrical signal rises above a second threshold level, said first threshold level being of lesser magnitude than said second threshold level for imparting hysteresis to the input/output voltage transfer characteristics of said Schmitt-trigger circuit, said Schmitt-trigger circuit thereby serving to sharpen rising and falling edges of transitions of said light responsive electrical signal and to increase the immunity of said toy doll to light flicker conditions resulting from fluorescent lighting, said circuit means being responsive to transitions in the binary output signal provided by said Schmitt-trigger circuit for providing said enabling signal.

19. A toy doll as recited by claim 18 wherein said first and second oscillators each comprise an inverting logic gate having first and second inputs and an output, each of said first and second inputs exhibiting Schmitt-trigger action with respect to the output of each said inverting logic gate, the first input of each of said inverting logic gates being coupled in common to said circuit means for receiving said enabling signal, the second input of each of said inverting logic gates being coupled through a feedback resistor to the respective output thereof, the second input of each of said inverting logic gates being further coupled through an associated capacitor to a fixed reference voltage.

20. A toy doll as recited by claim 19 wherein said Schmitt-trigger circuit included within said circuit means comprises a third inverting logic gate having at least one input exhibiting Schmitt-trigger action with respect to the output thereof, and wherein said first, second and third inverting logic gates are provided within a single CMOS integrated circuit.

21. A toy doll as recited by claim 18 wherein said second oscillator further includes a control terminal for receiving a control voltage, said second oscillator being responsive to said control voltage for selectively varying at least the frequency or the duty cycle of said second oscillating signal, and wherein the output of said Schmitt-trigger circuit is connected to said control terminal for providing said control voltage thereto.

22. A toy doll as recited by claim 19 wherein said second oscillator further includes an RC control network having an input control terminal and an output control terminal, the input control terminal being coupled to the output of said Schmitt-trigger circuit within said circuit means, and the output control terminal being coupled to the second input of said inverting logic gate of said second oscillator for selectively varying at least the frequency or duty cycle of said second oscillating signal in accordance with the binary output state of said Schmitt-trigger circuit within said circuit means.

23. A toy doll having a doll body and generating audible sounds in response to particular variations of light impinging on at least two portions of said doll body, comprising in combination:

(a) optical sensor means having first and second light sensors positioned at first and second locations within said doll body for viewing first and second light fields, said optical sensor means including an output terminal for providing an output signal having first and second output states, the output signal assuming a first output state when said first light sensor receives relatively more light than said second light sensor, the output signal assuming a second output state when said second light sensor receives relatively more light than said first light sensor;

(b) detecting means coupled to said output terminal of said optical sensor means and responsive to transitions of the output signal between the first and second output states for generating a trigger pulse in response to such transitions;

(c) audio generator means coupled to said detecting means and responsive to said trigger pulse for generating audio signals for a predetermined duration; and (d) a speaker coupled to said audio generator means for providing audible signals in response to said audio signals.

24. A toy doll as recited by claim 23 further including a Schmitt-trigger circuit for coupling said optical sensor means to said detecting means, said Schmitt-trigger circuit having an input coupled to the output terminal of said optical sensor means and an output terminal coupled to said detecting means, said Schmitt-trigger circuit serving to sharpen rising and falling edges of transitions of the output signal provided by said optical sensor means and to increase the immunity of said toy doll to light flicker conditions resulting from fluorescent lighting.

25. A toy doll as recited by claim 23 wherein said first and second light fields are separate from one another and are non-overlapping.

* * * * *